United States Patent
Chang et al.

(10) Patent No.: US 7,755,229 B2
(45) Date of Patent: Jul. 13, 2010

(54) HYBRID STEP MOTOR

(75) Inventors: Chia-Ming Chang, Taichung (TW); Chia-Chun Wei, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 185 days.

(21) Appl. No.: 12/189,154

(22) Filed: Aug. 9, 2008

(65) Prior Publication Data

US 2010/0033048 A1 Feb. 11, 2010

(51) Int. Cl.
*H02K 37/12* (2006.01)
*H02K 37/14* (2006.01)

(52) U.S. Cl. ............... 310/49.32; 310/49.37; 310/49.39; 310/49.43

(58) Field of Classification Search ............... 310/49.23, 310/49.32–49.37, 49.39, 49.43–49.45, 49.53
See application file for complete search history.

(56) References Cited

U.S. PATENT DOCUMENTS

| | | | | |
|---|---|---|---|---|
| 3,956,650 A | * | 5/1976 | Field, II | 310/156.65 |
| 4,347,457 A | * | 8/1982 | Sakamoto | 310/256 |
| 4,636,668 A | * | 1/1987 | Nikaido | 310/49.32 |
| 5,410,200 A | * | 4/1995 | Sakamoto et al. | 310/49.32 |
| 6,057,613 A | * | 5/2000 | Trago | 310/216.111 |
| 6,249,066 B1 | * | 6/2001 | Ikegami et al. | 310/49.23 |
| 7,385,321 B2 | * | 6/2008 | Ohnishi et al. | 310/49.19 |
| 2005/0067903 A1 | * | 3/2005 | Enomoto et al. | 310/49 R |

* cited by examiner

*Primary Examiner*—Tran N Nguyen
(74) *Attorney, Agent, or Firm*—Banger Shia

(57) ABSTRACT

A hybrid step motor comprises a stator, a rotor assembly, a magnet and a mandrel. The rotor assembly and the magnet are mounted on the mandrel and are disposed in the stator. The proportion of a stator outer diameter to a stator inner diameter is 1:0.475 to 1:0.6. The proportion of the stator outer diameter to a rotor outer diameter is 1:0.5125 to 1:0.5875. The proportion of a first rotor thickness to a magnet thickness to a second rotor thickness is 0.236:0.09:0.236 optimally. The proportion of the rotor outer diameter to a magnet outer diameter is 0.54:0.45. By such arrangements, the optimal proportion is formed and the output efficiency is improved.

9 Claims, 5 Drawing Sheets

HYBRID STEP MOTOR

BACKGROUND OF THE INVENTION

1. Field of the Invention

The present invention relates to a step motor which rotates by using magnetic field and electricity, and more particularly to a hybrid step motor which has low iron loss and high output efficiency with scaled inner and outer diameters of stator, rotor assembly and magnet under the condition that silicon steel sheets are unsaturated.

2. Description of the Prior Art

Many products are provided with a motor which is mainly provided for driving the structure to rotate, so as to control the continuous rotation, or angle change, or even the extension and positioning of the length of the structure. The quality of the motor lies on the proportion of an input power to an output efficiency, however, the size of the stator, rotor assembly and magnet of the current motor is unstandardized, and the specifications of the motors manufactured by the manufacturers are usually made according to the performance and convenience of processing, or integer. As a result, the efficiencies of such motors are different, and the specifications are not optimal, so that such motors have low efficiency and large iron loss, and will waste energy, or even a larger motor is needed to finish the same work, so that the cost is relatively high.

The present invention is an improved hybrid step motor which comprises a stator, a rotor assembly and a magnet, and the rotor assembly is disposed in the stator after clipping the magnet.

Therefore, finding a step motor which utilizes the smallest input power to produce the largest output efficiency so as to reduce iron loss has become an important issue for the manufacturers.

The present invention has arisen to mitigate and/or obviate the afore-described disadvantages.

SUMMARY OF THE INVENTION

The technical problems that needed to be solved:

The size of the stator, rotor assembly and magnet of the conventional hybrid step motor is unstandardized and unscaled, the efficiencies of the motors manufactured by the manufacturers are different, and the specifications are not optimal, so that such motors have low efficiency and will waste energy.

The technical characteristics for solving the problems:

The present invention provides a hybrid step motor which comprises a stator, a rotor assembly, a magnet and a mandrel. The rotor assembly and the magnet are mounted on the mandrel and are disposed in the stator. The proportion of a stator outer diameter of the stator to a stator inner diameter is 1:0.475 to 1:0.6, for example, when the stator outer diameter is 55 mm, the stator inner diameter is 30.4398 mm. The proportion of the stator outer diameter to a rotor outer diameter is 1:0.5125 to 1:0.5875, for example, when the rotor outer diameter is 29.945 mm, a first rotor length is 13 mm, and a second rotor length is 13 mm. The proportion of the first rotor thickness to a magnet thickness to the second rotor thickness is 0.236:0.09:0.236 optimally, for example, when the first thickness and second rotor thickness are 13 mm, the magnet thickness is 5 mm. In addition, the proportion of the rotor outer diameter to a magnet outer diameter is 0.54:0.45, for example, when the rotor outer diameter is 29.945 mm, the magnet outer diameter is 25 mm. By such arrangements, the optimal proportion is formed and the output efficiency is improved.

The advantages of the present invention compared with the prior art:

The scaled stator outer diameter, stator inner diameter, rotor thickness, rotor outer diameter, magnet outer diameter and magnet thickness of the stator, rotor assembly and magnet can obtain the best specification configuration, and can improve the output efficiency and reduce iron loss.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
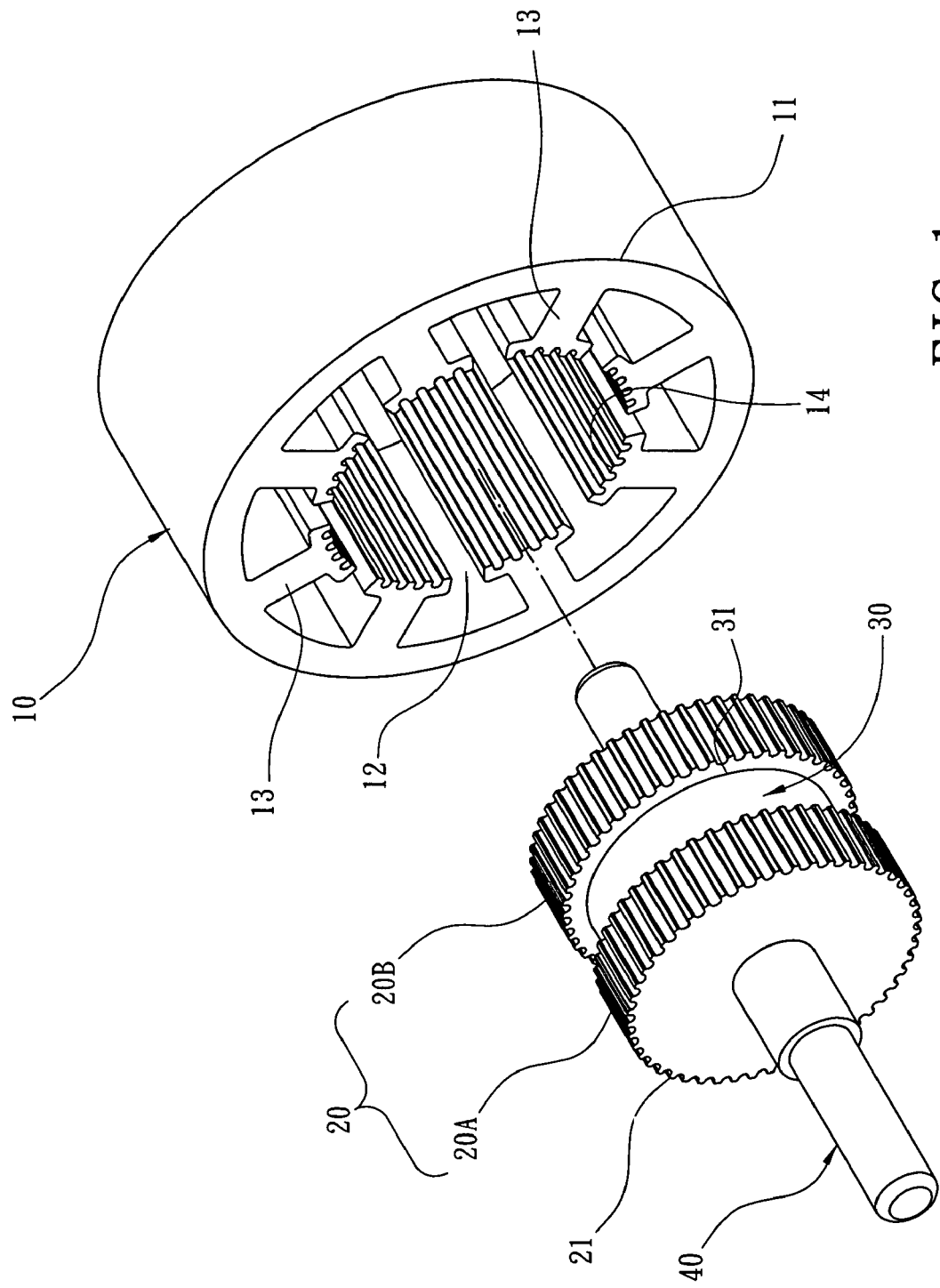
FIG. 1 is an exploded view of a hybrid step motor in accordance with the present invention.
Figure 2:
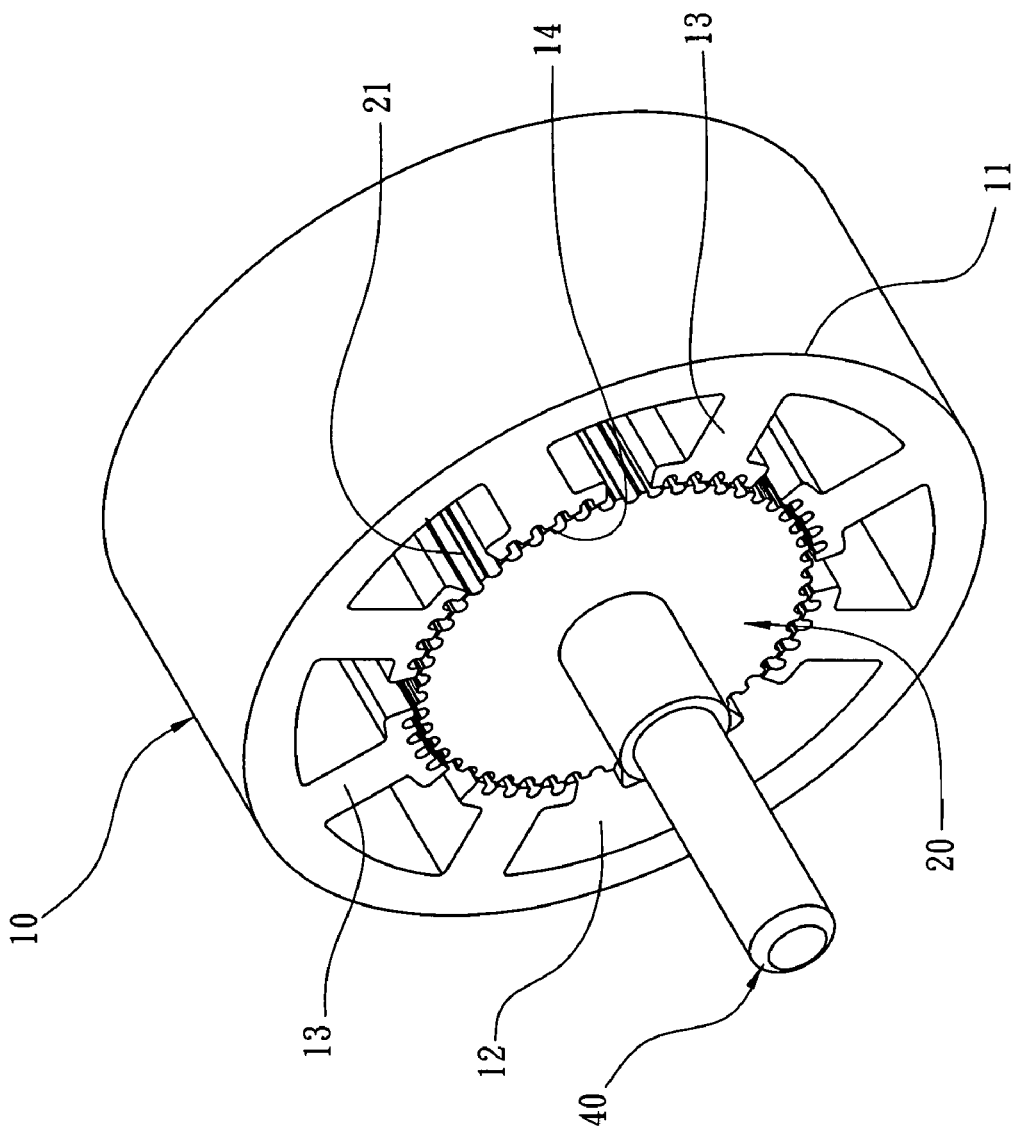
FIG. 2 is an assembly perspective view of the hybrid step motor in accordance with the present invention.
Figure 3:
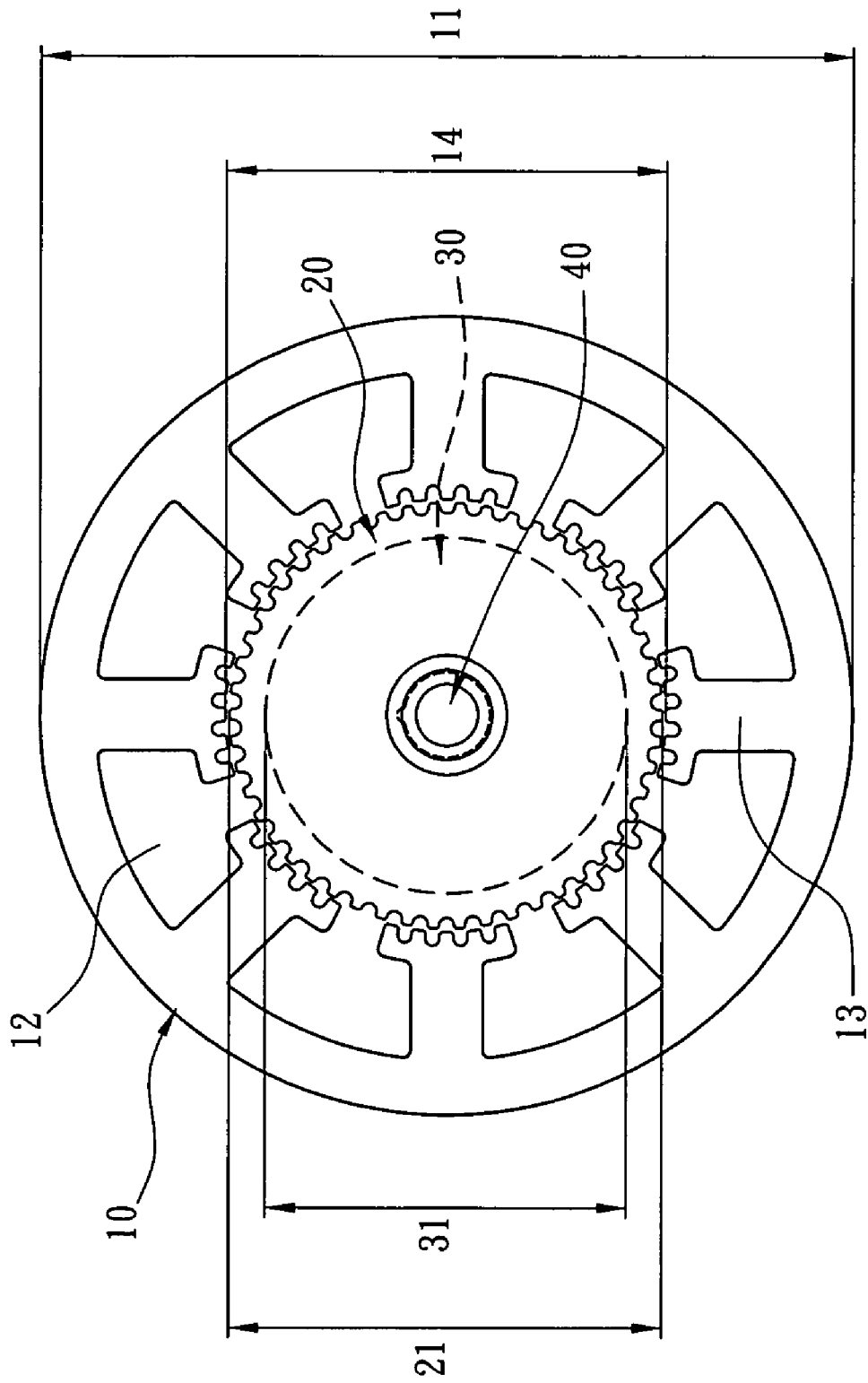
FIG. 3 is a front view of the hybrid step motor in accordance with the present invention.
Figure 4:
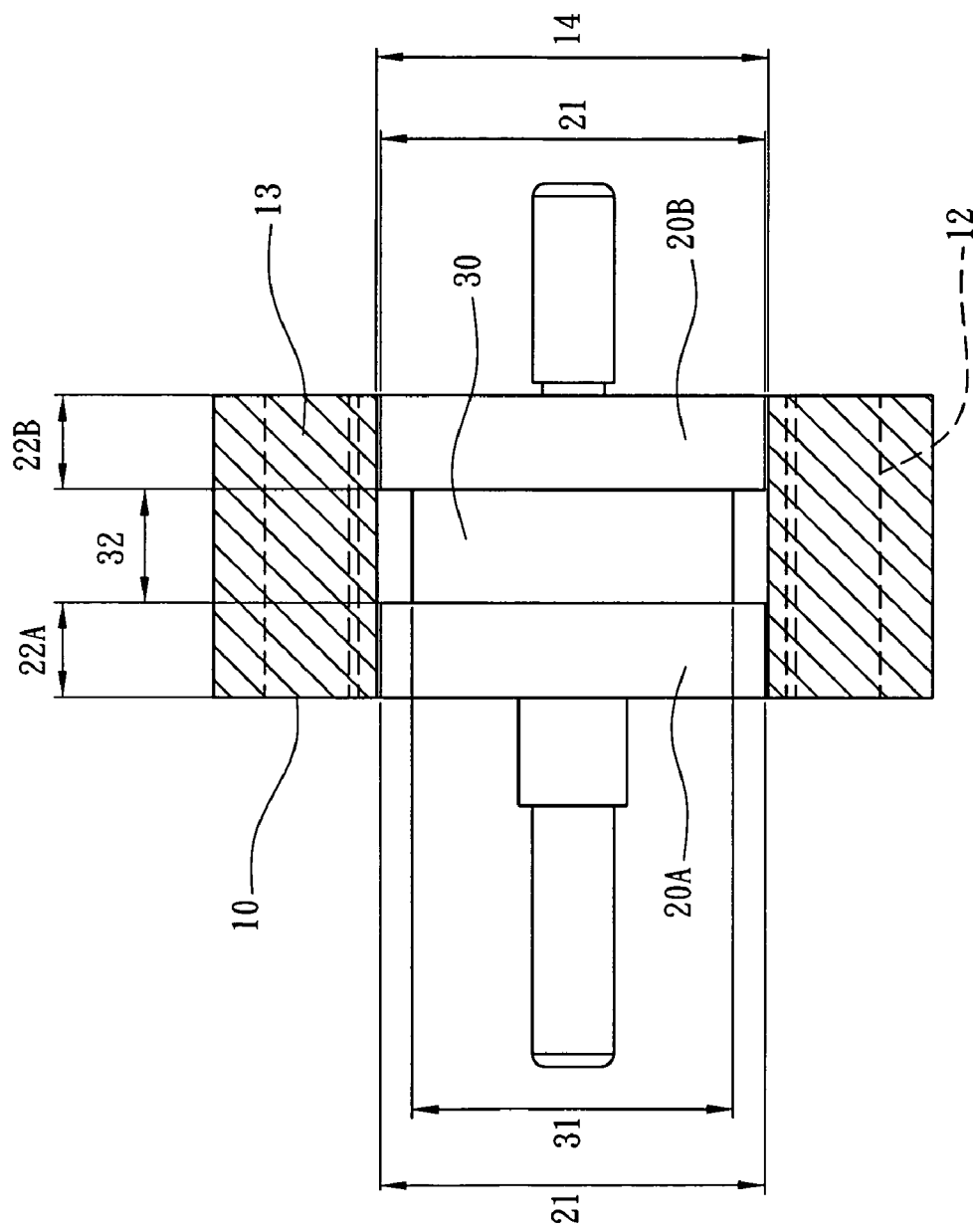
FIG. 4 is a side view of the hybrid step motor in accordance with the present invention.
Figures 5, 6:
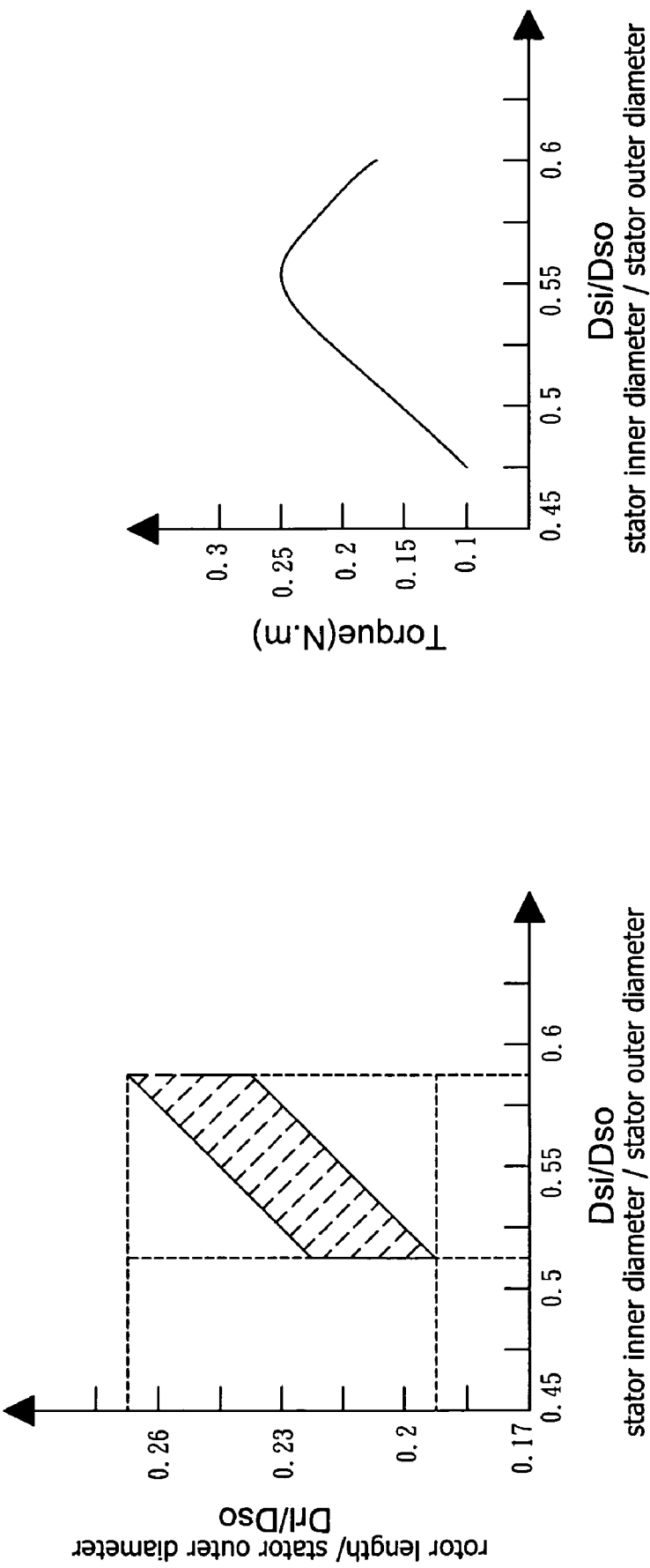
FIG. 5 is an area view showing the proportions of a stator inner diameter, a stator outer diameter and a rotor thickness.
FIG. 6 is a curve view showing the proportions of the stator inner diameter and the stator outer diameter.

Referring to FIGS. 1-6, a hybrid step motor in accordance with the present invention comprises a stator 10, a rotor assembly 20, a magnet 30 and a mandrel 40.

The stator 10 is formed with a stator outer diameter 11 having a magnetic space 12. In a periphery of the magnetic space 12 is provided a plurality of stator poles 13 that are spaced at intervals, and inner peripheries of the stator poles 13 form a stator inner diameter 14. The proportion of the stator outer diameter 11 to the stator inner diameter 14 is 1:0.475 to 1:0.6, the error is ±0.0375 mm, and the proportion of the stator outer diameter 11 to the stator inner diameter 14 is 1:0.55 optimally. When the stator outer diameter 11 is 55 mm, the stator inner diameter 14 is 30.4398 mm.

The rotor assembly 20 comprises a first rotor 20A and a second rotor 20B which are made of silicon steel sheets and are round-shaped. The rotor assembly 20 is formed with a rotor outer diameter 21. The first rotor 20A is formed with a first rotor thickness 22A along the axial direction, and the second rotor 20B is formed with a second rotor thickness 22B along the axial direction. The first and second rotors 20A and 20B are mounted on the mandrel 40 and are disposed in the magnetic space 12 of the stator 10. The proportion of the stator outer diameter 11 to the rotor outer diameter 21 is 1:0.5125 to 1:0.5875, the error is ±0.0375 mm, and the proportion of the stator outer diameter 11 to the rotor outer diameter 21 is 1:0.54 optimally. The rotor outer diameter 21 is 29.945 mm, the first rotor thickness 22A is 13 mm, and the second rotor thickness 22B is 13 mm.

The magnet 30 is formed with a magnet outer diameter 31 and is axially formed with a magnet thickness 32 along the axial direction. The magnet 30 is mounted on the mandrel 40 and is located between the first rotor 20A and the second rotor 20B. The proportion of the first rotor thickness 22A to the magnet thickness 32 to the second rotor thickness 22B is 0.236:0.09:0.236 optimally, and the error is ±0.0375 mm.

When the first rotor thickness and second rotor thickness 22A and 22B are 13 mm, the magnet thickness 32 is 5 mm. In addition, the proportion of the rotor outer diameter 21 to the magnet outer diameter 31 is 0.54:0.45, and the error is ±0.025 mm. When the rotor outer diameter 21 is 29.945 mm, the magnet outer diameter 31 is 25 mm.

The mandrel 40 is provided for mounting the rotor assembly 20 and the magnet 30, and making the rotor assembly 20 and the magnet 30 receive in the magnetic space 12 of the stator 10.

By the above-mentioned structure, the present invention has the following advantages: the scaled stator 10, rotor assembly 20 and magnet 30 can obtain the best specification configuration, and low iron loss can improve the output efficiency and save energy.

While we have shown and described various embodiments in accordance with the present invention, it should be clear to those skilled in the art that further embodiments may be made without departing from the scope of the present invention.

What is claimed is:

1. A hybrid step motor, comprising: a stator, a rotor assembly, a magnet and a mandrel, wherein:

the stator is formed with a stator outer diameter having a magnetic space, in a periphery of the magnetic space is provided a plurality of stator poles that are spaced at intervals, inner peripheries of the stator poles form a stator inner diameter, a proportion of the stator outer diameter to the stator inner diameter is 1:0.475 to 1:0.6;

the rotor assembly comprises a first rotor and a second rotor which are made of silicon steel sheets and are round-shaped, the rotor assembly is formed with a rotor outer diameter, the first rotor is formed with a first rotor thickness along a axial direction, the second rotor is formed with a second rotor thickness along the axial direction, the first and second rotors are mounted on the mandrel and are disposed in the magnetic space of the stator, a proportion of the stator outer diameter to the rotor outer diameter is 1:0.5125 to 1:0.5875;

the magnet is formed with a magnet outer diameter and is formed with a magnet thickness along the axial direction, the magnet is mounted on the mandrel and is located between the first rotor and the second rotor;

a proportion of the first rotor thickness to the magnet thickness to the second rotor thickness is 0.236:0.09:0.236, an error is ±0.0375 mm, a proportion of the rotor outer diameter to the magnet outer diameter is 0.54:0.45, an error is ±0.025 mm;

the mandrel is provided for mounting the rotor assembly and the magnet, and making the rotor assembly and the magnet receive in the magnetic space of the stator.

2. The hybrid step motor as claimed in claim 1, wherein the proportion of the stator outer diameter to the stator inner diameter is 1:0.55 optimally.

3. The hybrid step motor as claimed in claim 1, wherein the stator outer diameter is 55 mm, and the stator inner diameter is 30.4398 mm.

4. The hybrid step motor as claimed in claim 1, wherein the proportion of the stator outer diameter to the rotor outer diameter is 1:0.54 optimally.

5. The hybrid step motor as claimed in claim 1, wherein the rotor outer diameter is 29.945 mm, the first rotor thickness is 13 mm, and the second rotor thickness is 13 mm.

6. The hybrid step motor as claimed in claim 1, wherein the proportion of the first rotor thickness to the magnet thickness to the second rotor thickness is 0.236:0.09:0.236 optimally.

7. The hybrid step motor as claimed in claim 1, wherein when the first rotor thickness and second rotor thickness are 13 mm, the magnet thickness is 5 mm.

8. The hybrid step motor as claimed in claim 1, wherein the proportion of the rotor outer diameter to the magnet outer diameter is 0.54:0.45 optimally.

9. The hybrid step motor as claimed in claim 1, wherein when the rotor outer diameter is 29.945 mm, the magnet outer diameter is 25 mm.

* * * * *